United States Patent
Nose et al.

(10) Patent No.: US 8,587,848 B2
(45) Date of Patent: Nov. 19, 2013

(54) IMAGE READING APPARATUS

(75) Inventors: Yoshitaka Nose, Kyoto (JP); Satoshi Washida, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 23 days.

(21) Appl. No.: 13/395,957

(22) PCT Filed: Sep. 24, 2010

(86) PCT No.: PCT/JP2010/005761
§ 371 (c)(1),
(2), (4) Date: Mar. 14, 2012

(87) PCT Pub. No.: WO2011/036882
PCT Pub. Date: Mar. 31, 2011

(65) Prior Publication Data
US 2012/0170087 A1    Jul. 5, 2012

(30) Foreign Application Priority Data
Sep. 28, 2009  (JP) ................................. 2009-223035

(51) Int. Cl.
*H04N 1/04* (2006.01)
(52) U.S. Cl.
USPC ............ 358/498; 358/497; 358/474; 358/496
(58) Field of Classification Search
USPC .................................. 358/498, 497, 474, 496
See application file for complete search history.

(56) References Cited

U.S. PATENT DOCUMENTS

| | | | | |
|---|---|---|---|---|
| 5,532,826 A | * | 7/1996 | Miyao et al. | 358/296 |
| 7,421,228 B2 | * | 9/2008 | Tomura | 399/118 |
| 2007/0045945 A1 | | 3/2007 | Iwago | |
| 2008/0246208 A1 | | 10/2008 | Akiyama et al. | |

FOREIGN PATENT DOCUMENTS

| | | |
|---|---|---|
| JP | 2002-220146 A | 8/2002 |
| JP | 2002-278332 A | 9/2002 |
| JP | 2004-136999 A | 5/2004 |
| JP | 2005-167477 A | 6/2005 |

(Continued)

OTHER PUBLICATIONS

English translation of Official Communication issued in corresponding International Application PCT/JP2010/005761, mailed on Apr. 19, 2012.

(Continued)

*Primary Examiner* — Houshang Safaipour
(74) *Attorney, Agent, or Firm* — Keating & Bennett, LLP

(57) ABSTRACT

A document feeding route is provided in an automatic document feeder, and a feeder cover is provided on an upper portion of the automatic feeder and arranged to open and close an upstream half route of the document feeding route by being movable in a pivoting fashion. A plurality of pairs of drive rollers and idler rollers are provided in a downstream half route to feed a document toward a document ejection port. A jam clearance mechanism arranged to move the idler rollers or the drive rollers in a direction toward releasing a nipped state is arranged to face the downstream half route. The jam clearance mechanism includes a pair of cam frames and releasing bodies. The cam frames undergo a sliding displacement in a direction along which the pairs of idler rollers and drive rollers are arranged in coordination with opening and closing of the feeder cover. The releasing bodies move back and forth in coordination with the sliding movement of the cam frames.

9 Claims, 7 Drawing Sheets

(56) References Cited

FOREIGN PATENT DOCUMENTS

| JP | 2007-60085 A | 3/2007 |
|---|---|---|
| JP | 2008-254892 A | 10/2008 |
| JP | 2009-227440 A | 10/2009 |

OTHER PUBLICATIONS

Official Communication issued in International Patent Application No. PCT/JP2010/005761, mailed on Nov. 16, 2010.

* cited by examiner

IMAGE READING APPARATUS

BACKGROUND OF THE INVENTION

1. Field of the Invention

The present invention relates to an image reading apparatus used in a copier, a scanner, a fax machine, or the like. More particularly, the present invention relates to an improvement to a jam clearance mechanism that relieves a paper jam occurring in an automatic document feeder (hereinafter called "ADF") provided in a platen cover.

2. Description of the Related Art

A known jam clearance mechanism of this type is presented in, for example, Laid-open Japanese Patent Application Publication No. 2002-220146 (see, in particular, paragraph [0033] and FIG. 5). In Laid-open Japanese Patent Application Publication No. 2002-220146, a paper ejection guide is pushed downward against a force of a spring by raising a paper feeding tray from a normal horizontal orientation to an upright orientation. As a result, an idle paper ejecting roller provided on the paper ejection guide separates from a driving paper ejecting roller, making it easier to remove a document. An eccentric cam for pushing the paper ejection guide downward is provided near a swinging center of the paper feeding tray.

Laid-open Japanese Patent Application Publication No. 2004-136999 discloses a similar jam clearance mechanism. In a jam clearance mechanism according to Laid-open Japanese Patent Application Publication No. 2004-136999 (see, in particular paragraphs [0041] and [0042], and FIG. 1), a movement occurring when opening a cover of an upper portion of an ADF is conveyed to a releasing lever by another lever and causes a separation pad arranged to rock in tandem with the releasing cover to separate from a circumferential surface of a separation roller, thereby making it easier to remove a document.

There is another known jam clearance mechanism for clearing a paper jam in a fusing section of a copier. In this jam clearance mechanism, a special paper ejection dial is provided in a recording paper document feeding route and a recording paper is removed by turning the paper ejection dial (Laid-open Japanese Patent Application Publication No. 2002-278332 (see, in particular, paragraph [0019] and FIG. 5)).

With the jam clearance mechanisms disclosed in Laid-open Japanese Patent Application Publication No. 2002-220146 and Laid-open Japanese Patent Application Publication No. 2004-136999, a document is rendered easier to remove by manipulating a paper feed tray to an upright orientation such that a pair of paper ejecting rollers separate from each other or by opening a cover such that a separation pad and a separation roller separate from each other.

However, with the jam clearance mechanism of Laid-open Japanese Patent Application Publication No. 2002-220146, a pair of paper ejecting rollers provided at a finishing end of a document feeding route are merely separated from each other. Similarly, with the jam clearance mechanism of Laid-open Japanese Patent Application Publication No. 2004-136999, a separation pad and a separation roller provided at starting end of a document feeding route are merely separated from each other.

In many cases, a document feeding route of an ADF is configured to have a U-shaped configuration such that a paper supply port and a paper ejection port can be provided on the same side surface and a plurality of pairs of feeding rollers are provided along the document feeding route. Consequently, if a paper jam occurs in an intermediate portion of the document feeding route, the document cannot be ejected by using the jam clearance mechanism according to Laid-open Japanese Patent Application Publication No. 2002-220146 or Laid-open Japanese Patent Application Publication No. 2004-136999. In such a case, it is necessary to provide a jam clearance mechanism that can accommodate a paper jam occurring in an intermediate portion of the document feeding route, but this is not easy to accomplish.

With the jam clearance mechanism of Laid-open Japanese Patent Application Publication No. 2002-278332, a paper jam occurring in an intermediate portion of the document feeding route may be cleared by turning the paper ejection dial and removing the recording paper. However, it is necessary to perform tasks such as opening a cover or opening a drawer of a case of a fusing unit before the paper ejection dial can be operated. The series of tasks required to eject the paper takes effort and becomes troublesome to a user. Moreover, although the series of tasks for ejecting a jammed piece of paper needs to be executed in a prescribed order, there are cases in which a user neglects the order and attempts to forcefully remove a jammed sheet of recording paper or a document, thereby causing damage to the paper.

SUMMARY OF THE INVENTION

Preferred embodiments of the present invention provide an image reading device that allows a jammed document to be removed reliably and with little effort.

A plurality of preferred embodiments of the present invention will now be explained. Various features, aspects and characteristics of the different preferred embodiments of the present invention can be combined freely as required or desired.

An image reading device according to a preferred embodiment of the present invention includes a platen cover and an automatic document feeder. The automatic document feeder is provided on the platen cover and arranged to feed a document from a paper supply port to a paper ejection port. The automatic document feeder includes a document feeding route, a feeder cover, a roller mechanism, and a jam clearance mechanism. The document feeding route includes an upstream half route on a paper supply port side and a downstream half route on a paper ejection port side. The feeder cover is arranged to cover the upstream half route and is movable between a closed position and an open position. The roller mechanism includes a plurality of drive rollers installed along the downstream half route and a plurality of idler rollers arranged in positions opposite the drive rollers such that the downstream half route is disposed in-between. The roller mechanism is arranged to nip a document between the drive rollers and the idler rollers and feed the document toward the paper ejection port. The jam clearance mechanism is arranged to face the downstream half route and arranged to separate the idler rollers and drive rollers from each other in coordination with a movement of the feeder cover from the closed position to the open position.

With this apparatus, the document feeding route in the automatic document feeder includes an upstream half route on a paper supply port side and a downstream half route on a paper ejection port side, and the upstream half route can be opened by opening the feeder cover. Also, the drive rollers and the idler rollers arranged in the downstream half route are separated from each other by the jam clearance mechanism in coordination with opening and closing the feeder cover by moving either the drive rollers or the idler rollers.

In this way, an opening movement of the feeder cover is used to actuate the jam clearance mechanism and release a nipped state between the two sets of rollers. Thus, by merely opening the feeder cover, the upstream half route can be opened and, at the same time, a document can be released from between the drive rollers and the idler rollers. As a result, a document can be removed more easily. Furthermore, even when a paper jam occurs in an intermediate portion of the document feeding route, the jammed document can be removed reliably with a small amount of effort.

It is acceptable to construct the apparatus such that when the feeder cover is moved from the closed position to the open position, at least one of the idler rollers is moved away from a corresponding drive roller.

With such a configuration, the structure of the jam clearance mechanism can be simplified because the roller that is moved to release the nipped state between the rollers is the idler roller. Additionally, this configuration allows a more complex drive roller drive structure to be avoided and prevents the structure of the entire automatic document feeder from becoming unduly complex.

It is acceptable that the jam clearance mechanism further includes a cam frame arranged to undergo sliding displacement in a direction along which a plurality of roller pairs are arranged, each roller pair including one of the idler rollers and one of the drive rollers, the sliding displacement occurring in coordination with opening and closing of the feeder cover, and at least one of the idler rollers is arranged to be movable by the cam frame.

With a jam clearance mechanism including a cam frame, a state of close contact between at least one idler roller and a drive roller can be released by displacing the cam frame in a sliding fashion in coordination with opening the feeder cover such that the idler roller separates from the drive roller. Thus, even when a paper jam occurs in the downstream half route, the jammed document can be removed reliably with a small amount of effort.

It is acceptable for the jam clearance mechanism to further include a first cam that is arranged on the cam frame and arranged to contact a shaft provided on an end portion of a main body of at least one of the idler rollers.

Since the at least one idler roller is pushed by the first cam, the cam frame can be made smaller and the jam clearance mechanism can be made more compact than if the main body of the idler roller is pushed by the cam frame. The shaft of the idler roller has a smaller diameter dimension than the main body of the idler roller.

It is acceptable that the jam clearance mechanism further includes a releasing body arranged to move at least one of the idler rollers in coordination with a sliding movement of the cam frame.

Since the idler rollers are separated by the releasing body as well as by the first cam, the idler rollers can be separated individually by the first cam and the releasing body, such that each of the idler rollers is separated along a direction that is appropriate for the particular idler roller. For example, one idler roller can be moved diagonally downward and leftward by the first cam and another idler roller can be moved diagonally downward and rightward by the releasing body. Thus, even in a situation where each of the idler rollers needs to be separated in a different direction due to the different positions in which the idler rollers are arranged along the downstream half route, each of the idler rollers can be moved appropriately by the first cam and the releasing body. The direction in which an idler roller is moved in order to separate it from a drive roller differs depending on whether the idler roller is arranged in a curved portion or a straight portion.

It is acceptable for the releasing body to contact a shaft of at least one of the idler rollers and for the jam clearance mechanism to include a second cam that is arranged on the cam frame and arranged to move the releasing body. The releasing body contacts the shaft of the idler roller, similarly to the first cam explained previously, and the idler roller is separated from the drive roller by the releasing body. Thus, the idler roller can be separated from the drive roller by the cam frame acting on an idler roller shaft having a smaller diameter than the idler roller. As a result, the releasing body can be made smaller and the jam clearance mechanism can be made more compact than a case in which the releasing body acts on the idler roller. Furthermore, the first cam and the releasing body can be arranged at front and rear ends of the shafts of the idler rollers where they will not impede the passage of paper. Also, the first cam and the second cam provided on the cam frame serve to convert a sliding movement of the cam frame into a movement oriented perpendicularly or substantially perpendicularly relative to the sliding direction and thereby separate the releasing body from the idler roller shaft. Thus, the cam frame and the releasing body can be made to operate in a coordinated manner without requiring a complex structure. This aspect contributes to making the jam clearance mechanism more compact.

It is acceptable that the releasing body includes a shaft catching section arranged to catch the shaft of one of the idler rollers and a movement receiving piece arranged to be movable by the second cam.

It is acceptable that the document feeding route is shaped like a sideways letter "U", and the apparatus is further provided with a first reading unit and a second reading unit. The first reading unit is arranged inside a document platform and arranged to read a first surface of a document. The second reading unit is arranged in a space surrounded by the document feeding route and includes a contact glass to enable reading a second surface of a document. The second reading unit is supported such that the second reading unit can pivot between an in-use position where the contact glass is positioned in the downstream half route and an escape position where the contact glass is located outside the upstream half route. A pressing frame arranged to press a document against the contact glass is arranged such that the pressing frame faces the contact glass of the second reading unit. The releasing body is provided on the pressing frame. When the feeder cover is opened and the second reading unit is in the escape position, the entire upstream half route is open and a portion of the downstream half route located between the paper ejection port and a drive roller located closely adjacent to the pressing frame is open.

In an automatic document feeder including a second reading unit disposed inside, a portion of the downstream half route between a drive roller and the paper ejection port can be opened by moving the second reading unit into an escape position, thus making it easier to extract a document jammed in the downstream half route. Also, since a route between the drive roller and the paper ejection port is opened, a document can be extracted while the jammed state of the paper is visually recognized. Thus, a situation in which a portion of the paper surface is damaged in the process of extracting the document can be reliably prevented from occurring. In short, an image reading apparatus including an automatic document feeder equipped with a reading unit can be provided in which the automatic document feeder has a significantly improved and much more effective jam clearance mechanism.

It is acceptable that the cam frame includes a slide section that is long in a direction along which the pairs of idler rollers and drive rollers are arranged. It is also acceptable that the cam frame includes a movement receiving section provided as an integral portion of an end portion of the slide section. It is also acceptable that the cam frame is supported such that the cam frame can slide between a first position in which a nipped state exists between the idler rollers and the drive rollers and a second position in which the idler rollers are separated from the drive rollers. In such a case, the feeder cover includes a pivot shaft, a first operating section provided near the pivot shaft and arranged to operate the movement receiving section toward an operating position, and a second operating section provided near the pivot shaft and arranged to operate the movement receiving section toward a waiting position.

Since the sliding section and the movement receiving section are provided on the cam frame and the cam frame is movable between the first position and the second position by operating the movement receiving section with the first operating section and the second operating section of the feeder cover, the cam frame can be slid by utilizing a portion of or all of a movement that opens the feeder cover. For example, the apparatus can be arranged such that when the feeder cover is opened, a final portion of the stroke of the opening movement slides the cam frame and separates the idler rollers from the drive rollers. Similarly, the apparatus can be arranged such that when the feeder cover is moved to a closed position, a final portion of the stroke of the closing movement slides the cam frame and returns the idler rollers to being in close contact with the drive rollers. Thus, even if there is a large difference between an amount of movement the feeder cover undergoes during opening/closing and an amount of movement that the cam frame slides, the cam frame can be controlled in a way that the cam frame slides by an appropriate amount.

It is acceptable that the jam clearance mechanism also has a guide body arranged to guide an upper surface and a lower surface of the slide section such that the slide section can slide. Since the jam clearance mechanism includes a guide body arranged to guide an upper surface and a lower surface of the slide section such that the slide section can slide, the guide body prevents zigzagging and jiggling of the cam frame during sliding. As a result, the idler rollers can be separated from the drive rollers precisely and without delay in coordination with opening the feeder cover. Also, an operation in which the second cam of the guide body pushes the releasing body downward can be accomplished reliably.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

FIGS. 1 to 7 illustrate a preferred embodiment of an image reading apparatus according to the present invention, preferably included in a multifunction peripheral (MFP) equipped with a copy function and a facsimile function, for example. Directional terms such as "front," "rear," "left," "right," "upward," and "downward" used herein are in compliance with the "front," "rear," "left," "right," "upward," and "downward" written near the intersecting arrows shown in FIGS. 2 and 4.

Figure 2:
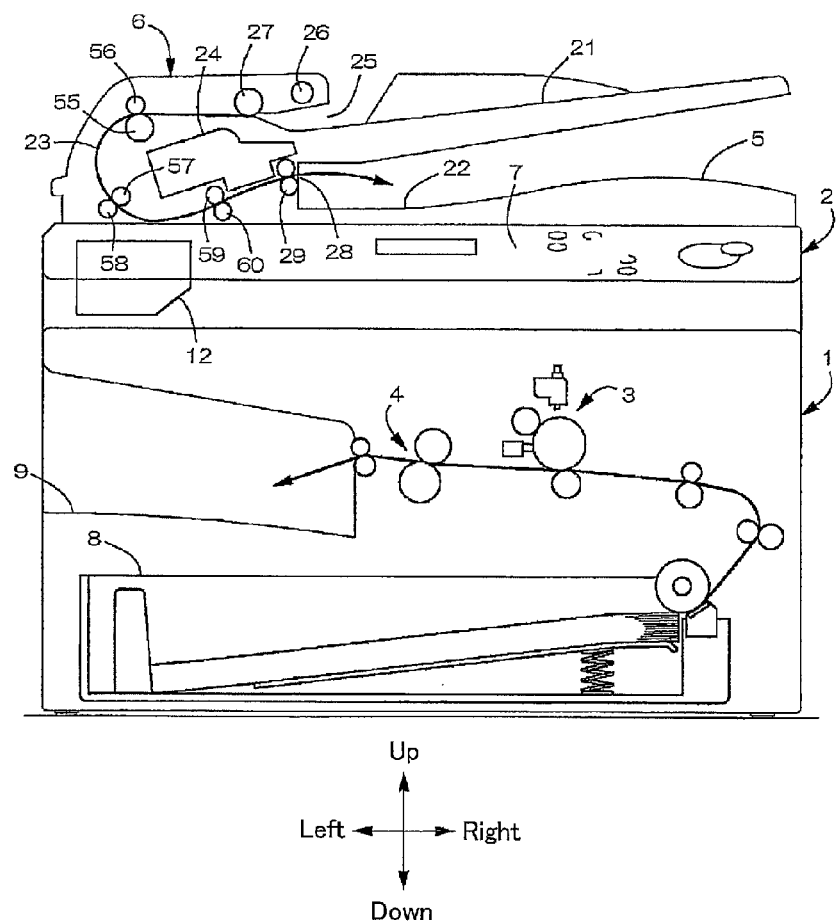
FIG. 2 is a frontal view illustrating the image reading apparatus conceptually.

As shown in FIG. 2, the multifunction peripheral includes a recording section 1 and an image reading section 2 arranged above the recording section 1. The recording section 1 includes an image recording device 3 and a fixing device 4. A platen cover 5 is arranged to open and close a document reading surface provided on an upper surface of the image reading section 2 and an ADF (automatic document feeding section) 6 is integrated onto an upper portion of the platen cover 5. An operating panel 7 is provided on a frontward surface of the image reading section 2. A paper feed cassette 8 is arranged in a lower portion of the recording section 1. Paper that has passed through the image recording device 3 and the fixing device 4 to print an image thereon is discharged to a paper ejection section 9 below the image reading section 2. The platen cover 5 can cover an upper surface of a document platform or open the upper surface of the document platform by being swung upward or downward about a hinge (not shown) provided at a rearward end of the platen cover 5.

Figure 3:
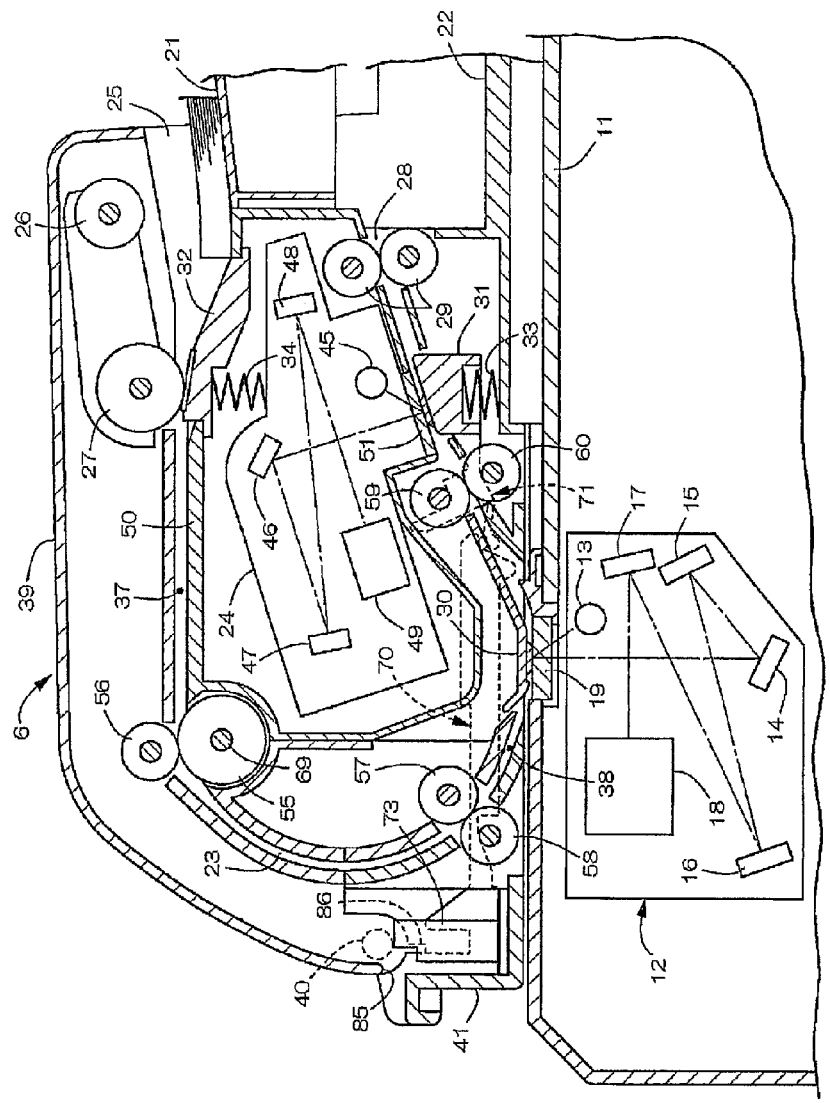
FIG. 3 is a vertical sectional frontal view of an automatic document feeder.

As shown in FIG. 3, a platen glass 11 covers the upper surface of the document platform. A first reading unit 12 arranged to read a first surface of an original document and a carriage arranged to support the first reading unit 12 are arranged inside the document platform. The first reading unit 12 includes a light source 13, first to fourth mirrors 14 to 17, and a CCD image sensor 18. The first reading unit 12 may be arranged directly below a contact glass 19 such that an image on a document can be read when the original document is fed along an upper surface of the contact glass 19 by the ADF 6. When a stationary document placed on the platen glass 11 is read, the first reading unit 12 performs scanning while being positioned below a side edge of the platen glass 11. The first surface of a document is a surface facing upward when the document is placed on a document tray 21, and the second surface of a document is a surface facing downward when the document is placed on the document tray 21.

The ADF 6 includes a sideways U-shaped document feeding route 23 provided between the document tray 21 and a paper discharge tray 22 arranged below the document tray 21. A second reading unit 24 is arranged to read a second surface of an original document is provided inside the document feeding route 23. In the document feeding route 23, there are provided a pickup roller 26 and a feed roller 27 arranged to face a paper supply port 25, three pairs of feed rollers 55, 56, 57, 58, 59, and 60 to be explained later, and paper ejecting rollers 29 arranged to face a paper ejection port 28.

Along the document feeding route 23, a pressing frame 30 is arranged opposite the contact glass 19 and serves to press a document against the contact glass 19, and a pressing frame 31 is arranged opposite a contact glass 51 of the second reading unit 24 and serves to press a document against the contact glass 51. Similarly, a pressing frame 32 arranged to press a document against the feed roller 27 is provided below the feed roller 27. The pressing frame 30 preferably is in the form of a cantilevered beam and achieves close contact with the contact glass 19 due to its own elasticity. The pressing frame 31 is pressed against the contact glass 51 by a compression coil spring 33, and the pressing frame 32 is pressed against the feed roller 27 by a compression coil spring 34, for example.

The document feeding route 23 is preferably configured to have a sideways U-shape such that the paper supply port 25 and the paper ejection port 28 can open through the same side surface. An upper half of the document feeding route 23 located closer to the paper supply port 25 constitutes an upstream half route 37, and a lower half of the document feeding route 23 located closer to the paper ejecting port 28 constitutes a downstream half route 38. The upstream half route 37 is a portion of the document feeding route spanning from the paper supply port 25 to an intermediate portion between the idler roller 56 and the idler roller 58, and refers to a portion of the document feeding route located upper than a middle portion of the curved route. As will be explained later, the upstream half route 37 is the portion opened when a feeder cover 39 is opened. The downstream half route 38 is a portion of the document feeding route spanning from the intermediate portion between the idler roller 56 and the idler roller 58 to the paper ejection port 28, and refers to a portion of the document feeding route located lower than the middle portion of the curved route.

Figure 4:
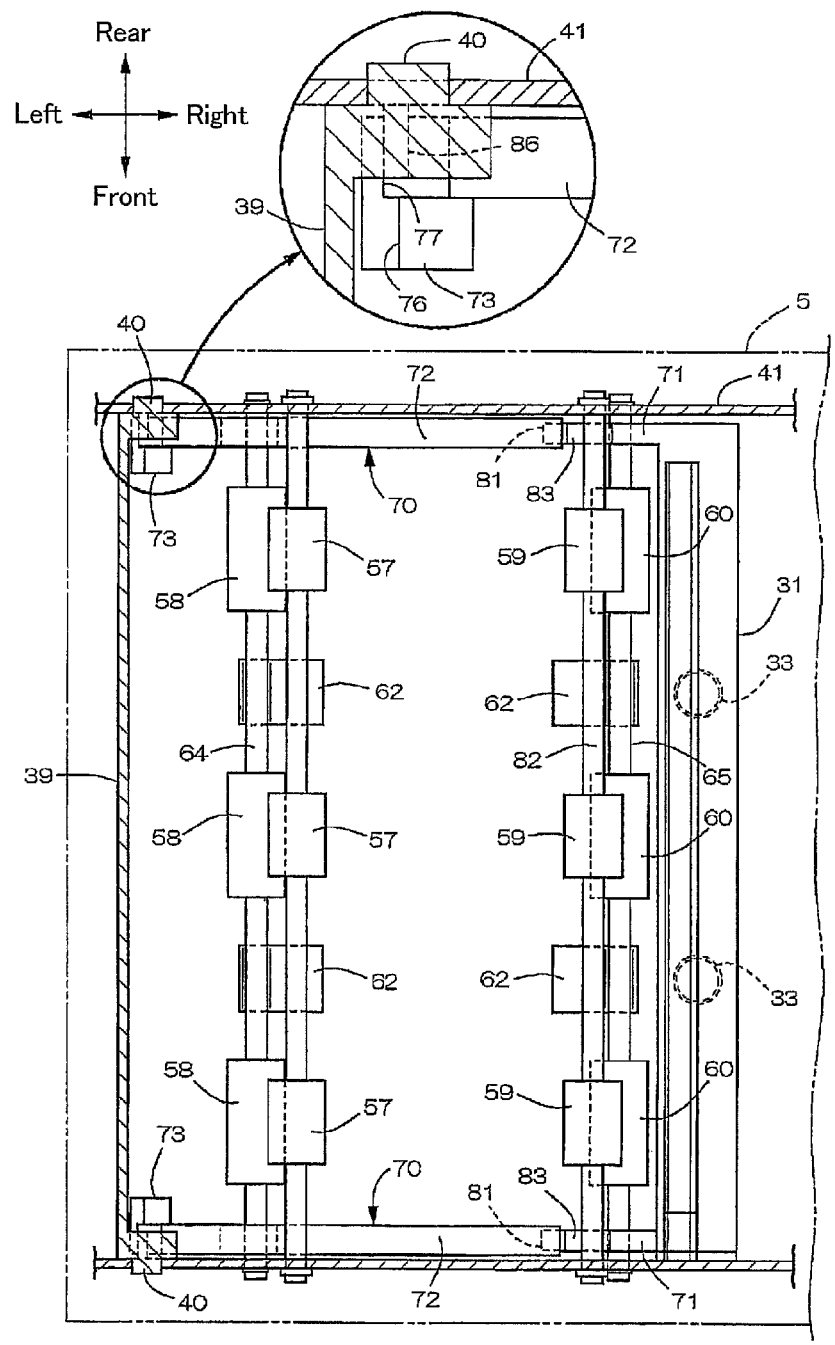
FIG. 4 is a horizontal sectional plan view showing the jam clearance mechanism.
Figure 5:
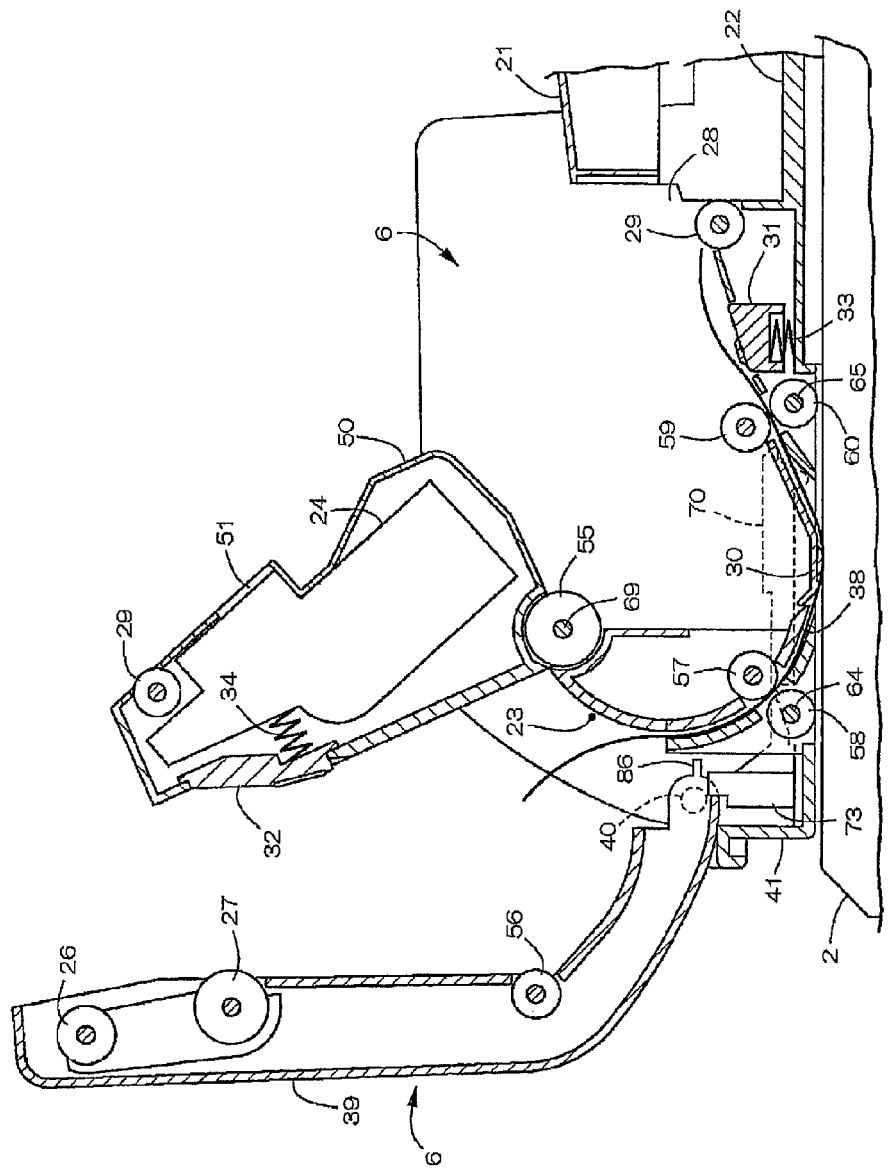
FIG. 5 is a vertical sectional frontal view of the automatic document feeder in a state in which the entire document feeding route has been opened.

The upstream half route 37 is covered by the feeder cover 39 and, as shown in FIG. 5, the entire upstream half route 37 can be opened by opening the feeder cover 39. The feeder cover 39 is preferably shaped like a sideways letter L and can be pivoted between a closed state shown in FIG. 3 and an open state shown in FIG. 5. For this reason, a pivot shaft 40 provided on an under portion of a side end of the feeder cover 39 is supported on a feeder frame 41 (see FIG. 4). When the feeder cover 39 is in the closed state, it forms an outer contour line of an upper portion of the ADF 6. The pickup roller 26 and the feed roller 27 described previously as well as an idler roller 56 explained later are provided on an inner surface of the feeder cover 39.

The second reading unit 24 includes components such as a light source 45, first to third mirrors 46 to 48, and a CCD image sensor 49, all housed inside a hollow housing 50. The contact glass 51 is provided on a lower wall of the housing 50 facing the first mirror 46, and the previously described pressing frame 31 is pressed closely against the contact glass 51. An upper wall of the housing 50 defines a portion of the upstream half route 37 together with the feeder cover 39, and the lower wall of the housing 50 defines a portion of the downstream half route 38 together with the feeder frame 41. The previously described pressing frame 32 is attached to the upper wall of the housing 50.

Figure 7:
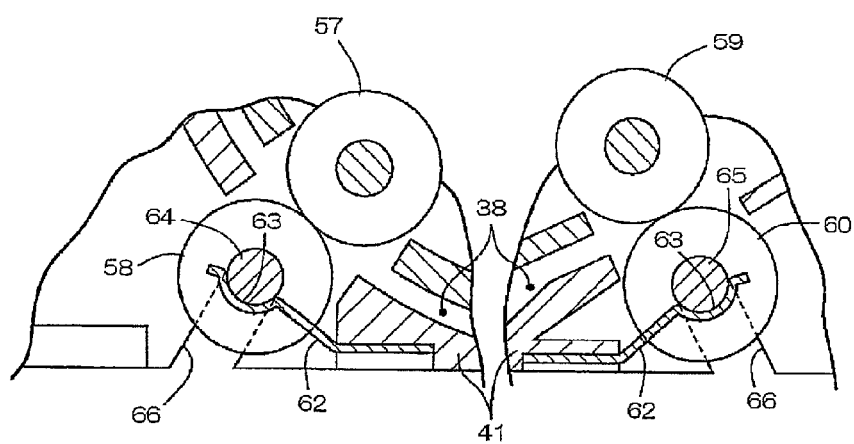
FIG. 7 is a sectional view showing a support structure of an idler roller.

One of the three pairs of feed rollers is arranged in a curved portion of the upstream half route 37 and the remaining two pairs of feed rollers are respectively arranged in a curved portion of the downstream half route 38 and in a position upstream of and adjacent to the pressing frame 31. The feed rollers include the drive rollers 55, 57, and 59 and the idler rollers 56, 58, 60. As shown in FIG. 7, each of the idler rollers 58 and 60 arranged in the downstream half route 38 is pushed by a spring 62 in such a direction that a circumferential surface of the idler rollers mates closely with the drive roller 57 or 59 (i.e., a direction that ensures a nipped state exists between the idler rollers and the drive rollers 57 and 59). Each of the springs 62 is a leaf spring having one end fixed to the feeder frame 41 and the other end of the leaf spring includes a shaft catching section 63 contacting an outside of the idler roller shaft 64 or 65 of each of the idler rollers 58 and 60. The idler rollers 58 and 60 and idler roller shafts 64 and 65 are controlled by the jam clearance mechanism (explained later) such that they slide along a guide groove 66 (see FIG. 7) provided in the feeder frame 41.

The upstream half route 37 can be opened by pivoting the feeder cover 39 so that documents jammed in the document feeding route 23 can be extracted easily. Meanwhile, the portion of the downstream half route 38 between the drive roller 59 and the paper ejection port 28 can be opened by pivoting the housing 50, which encloses the second reading unit 24, about a driver roller shaft 69 of the drive roller 55 (see FIG. 5). The idler rollers 58 and 60 can be separated from the drive rollers 57 and 59 by the jam clearance mechanism arranged along the downstream half route 38. As shown in FIG. 3, the housing 50 can be moved between an in-use position in which the contact glass 51 is positioned to face directly toward the downstream half route 38 and an escape position in which the housing 50 is located outside the upstream half route 37.

Figure 6:
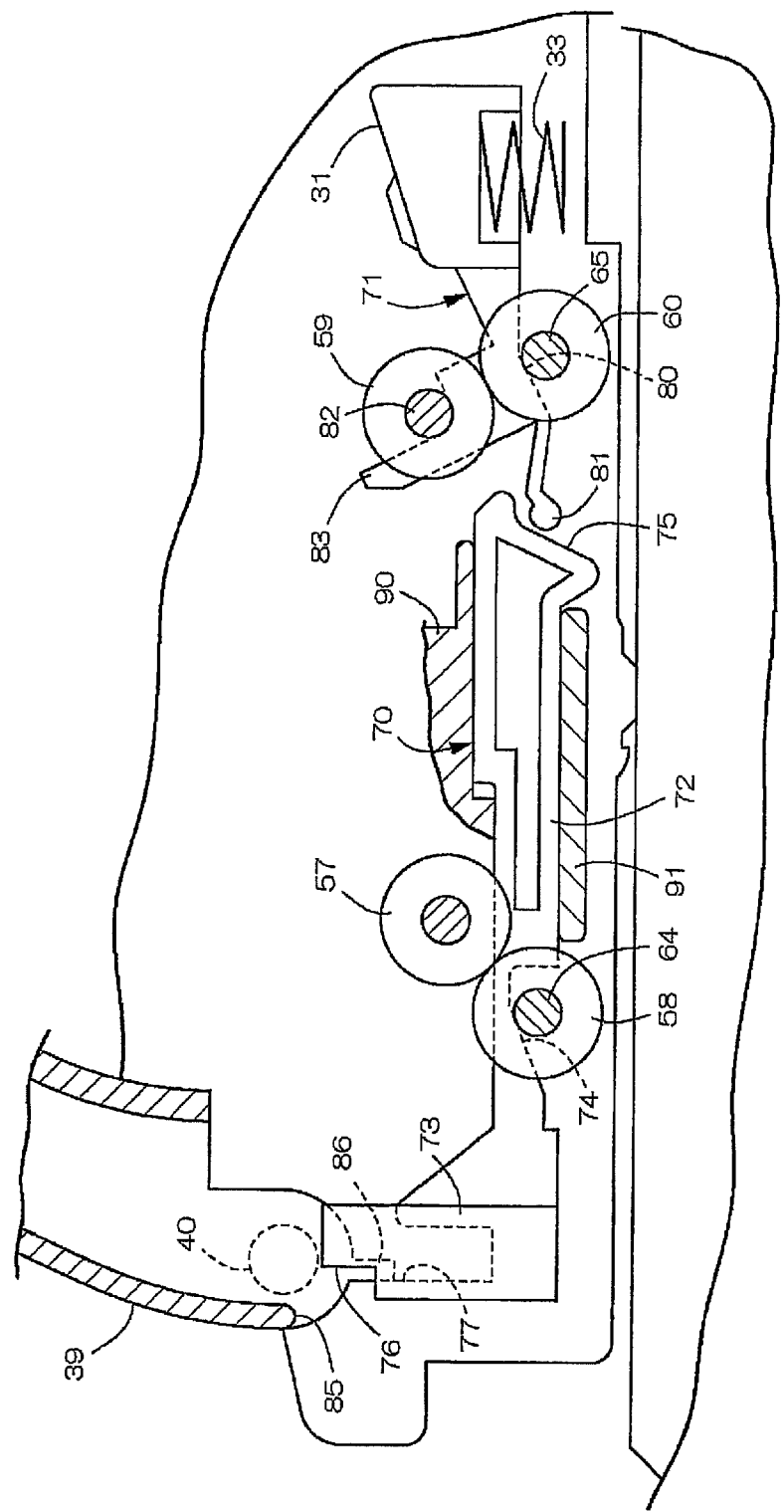
FIG. 6 is a frontal view of the jam clearance mechanism.

In FIG. 4 and FIG. 6, the jam clearance mechanism includes a pair of cam frames 70 supported such that they can slide in a direction along which the pairs of idler rollers and drive rollers are arranged in the feeder frame 41 and a pair of releasing bodies 71 that may be moved back and forth in coordination with the sliding movement of the cam frames 70. The cam frames 70 and the releasing bodies 71 are operated using open and close movements of the feeder cover 39. As shown in FIG. 6, each of the cam frames 70 includes a sliding section 72 that is long in a direction along which the pairs of idler rollers and drive rollers are arranged and a column-like movement receiving section 73 provided on a leftwardly protruding end of the sliding section 72. An upper guide body 90 is provided as an integral portion of an inside guide wall defining the document feeding route 23 and a lower guide body 91 is provided on the feeder frame 41. The upper guide body 90 serves to guide an upper surface of the sliding section 72 and the lower guide body 91 serves to guide a lower surface of the siding section 72 such that the sliding section 72 can slide. The inside guide wall defining the document feeding route 23 is disposed between the drive roller 55 and the pressing frame 30 as shown in FIG. 5, and the drive roller 57 is arranged at an intermediate position along the inside guide wall. A first cam 74 and a second cam 75 that separate the idler rollers 58 and 60 from the corresponding drive rollers are provided on a lower surface and a rightward end, respectively, of the slide section 72. Each of these cams 74 and 75 includes a flat, slanted surface. When the cam frames 70 slides from a waiting position shown in FIG. 6 to an operating position shown in FIG. 1, the idler rollers 58 and 60 are moved in directions separating away from the drive rollers 57 and 59.

As shown in FIG. 6, a first catching section 76 and a second catching section 77 to catch a movement occurring when the feeder cover 39 is opened are provided in an upper portion of the movement receiving section 73. The first catching section 76 is a leftward-facing vertical surface provided in an upper portion of the movement receiving section 73 and the second catching section 77 is a rightward-facing vertical surface closely adjacent to the first catching section 76. The releasing bodies 71 are provided on the frontward end and the rearward end of the pressing frame 31. Each of the releasing bodies 71 preferably is a one-piece integral unit including a shaft catching section 80 arranged to catch the idler roller shaft 65, a movement receiving piece 81 arranged to be operated by the second cam 75, and a sliding arm 83 arranged to be guided by a drive roller shaft 82.

The feeder cover 39 includes a first operating section 85 and a second operating section 86 provided near the pivot shaft 40. The first operating section 85 is arranged to contact the first catching section 76 and move the cam frame 70 toward the operating position, and the second operating section 86 is arranged to contact the second catching section 77 and move the cam frame 70 toward the waiting position. The first operating section 85 is provided on a lateral edge of a wall of the feeder cover 39 that is an upper wall when the cover is closed. The second operating section 86 is provided on a peripheral wall of the feeder cover 39 at the front portion and the rear portion thereof and, as shown in FIG. 6, protrudes in a vertically downward direction when the feeder cover 39 is closed. As shown in FIG. 5, when the feeder cover 39 is in an open state, a portion of the upper wall near the first operating section 85 rests on the feeder frame 41 and the open state is maintained due to gravity.

The manner in which an original document jammed in the ADF 6 is extracted from the feeder route 23 will now be explained. When a document is jammed in the paper supply port 25 or other portions of the upstream half route 37, the user opens the feeder cover 39. The feed roller 27 separates from the pressing frame 32 and the idler roller 56 separates from the drive roller 55 as the entire upstream half route 37 opens, making it very easy to remove the document. The document can also be removed quickly because it is accomplished with the one-touch operation of merely opening the feeder cover 39. Even if a portion of the document has entered the downstream half route 38 and reached a portion where the drive roller 57 and the idler roller 58 contact each other, the document can be removed easily because the rollers 57 and 58 are separated from each other in coordination with opening the feeder cover 39.

Figure 1:
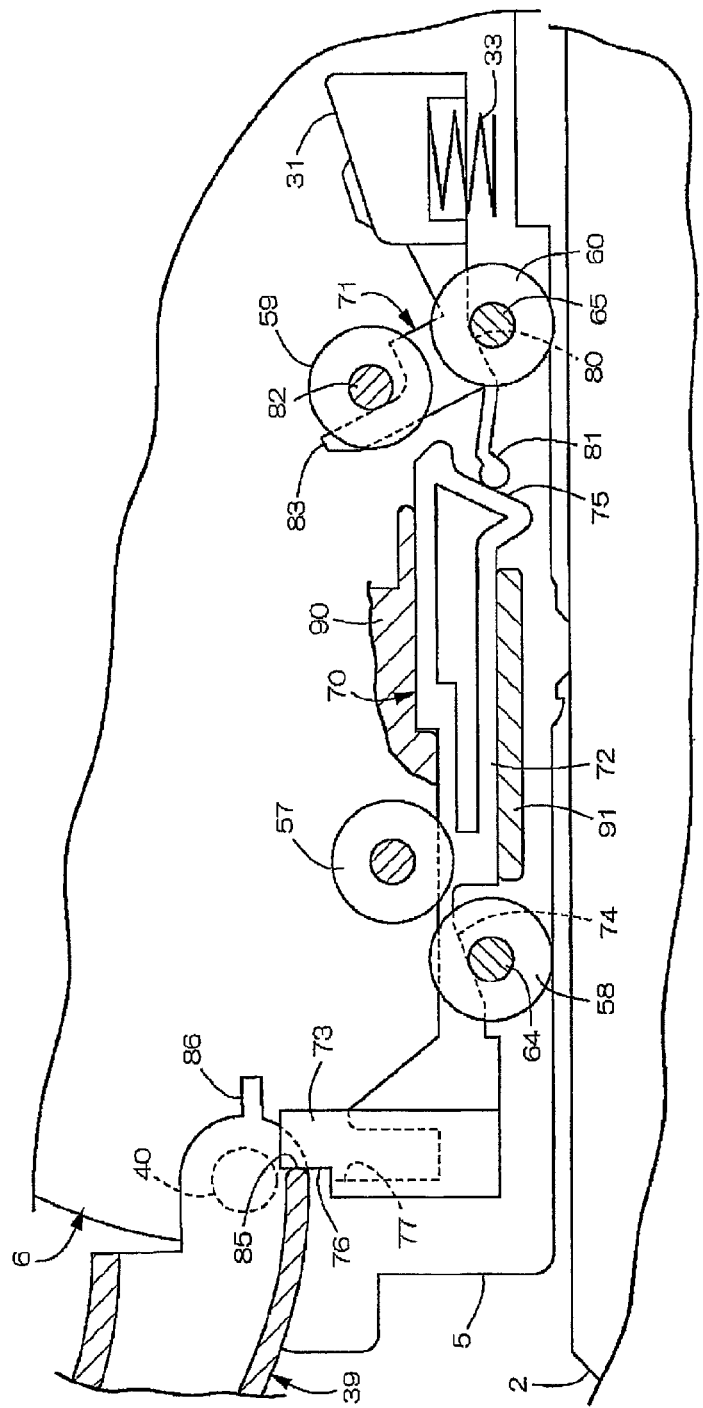
FIG. 1 is a vertical sectional frontal view of an image reading apparatus according to a preferred embodiment of the present invention with a jam clearance mechanism in a released state.

If the document is jammed in the downstream half route 38, then the user opens the feeder cover 39 and also opens the housing 50 to the escape position shown in FIG. 5. When the feeder cover 39 is opened, the first operating section 85 contacts the first catching section 76 of the movement receiving section 73 and the entire cam frame 70 is slid rightward from the perspective of FIG. 1. When the cam frame 70 slides rightward, the first cam 74 pushes the idler roller shaft 64 diagonally leftward and downward against the force of the spring 62. At the same time, the second cam 75 pushes the movement receiving piece 81 and the releasing body 71 diagonally downward such that the idler roller shaft 65 is pushed diagonally rightward and downward. As a result, the idler rollers 58 and 60 separate from the drive rollers 57 and 59 as shown in FIG. 1, such that a sufficient gap develops in-between to allow the document to be extracted.

By opening the housing 50 to the escape position, a portion of the downstream half route 38 located between the drive roller 59 and the paper ejection port 28 can be opened. Thus, as shown in FIG. 5, even if a document is jammed in the curved portion of the downstream half route 38, a portion of the document is exposed in the opened route and the document can be easily extracted. Afterwards, the housing 50 is returned to the in-use position and the feeder cover 39 is returned to a closed state such that the ADF 6 can be used.

When the feeder cover 39 is returned to the closed state, the second operating section 86 contacts the second catching section 77 of the movement receiving section 73 and causes the cam frame 70 to slide toward the waiting position. As a result, the binding action of the first cam 74 is released and the idler rollers 58 and the idler roller shaft 64 are pushed diagonally upward to their previous positions by the spring 62. Similarly, the binding action of the second cam 75 against the releasing body 71 is released and the idler rollers 60 and the idler roller shaft 65 are pushed diagonally upward to their previous positions by the spring 62. As a result, the idler rollers 58 and 60 are returned to being in close contact with the drive rollers 57 and 59, such that a document can be fed.

With a jam clearance mechanism configured as explained heretofore, the entire upstream half route 37 can be opened and a state of close contact between the drive rollers 57 and 59 and the idler rollers 58 and 60 can be released by merely opening the feeder cover 39. Also, by opening the housing 50 to the escape position, the portion of the route between the driver roller 59 and the paper ejection port 28 can be opened, thereby exposing the document. Thus, regardless of which portion of the document feeding route 23 a document is jammed in, the document can be removed reliably with a small amount of effort. Even if a paper jam occurs in an intermediate portion of the document feeding route 23, the close contact between the drive rollers 57 and 59 and the idler rollers 58 and 60 can be released and the binding action of the idler rollers with respect to the document can be released. Also, since a route between the drive roller 59 and the paper ejection port 28 may be opened, a document can be extracted while the jammed state of the paper is visually recognized. Thus, a situation in which a portion of the paper surface is damaged in the process of extracting the document can be reliably prevented from occurring.

Although a preferred embodiment of the present invention has been explained above, the present invention is not limited to the above-described preferred embodiment and various changes can be made without departing from the scope of the present invention. In particular, the features, elements and characteristics of the preferred embodiments and variations thereof explained in this patent specification can be combined in any desired manner as required.

Although the previously explained preferred embodiment presents a case in which a second reading unit 24 is preferably provided inside the ADF 6, a jam clearance apparatus according to a preferred embodiment of the present invention can also be applied to an ADF 6 that does not include such a reading unit. In such a case, the apparatus can be arranged such that the releasing of the state of close contact between the drive rollers 57 and 59 and the idler rollers 58 and 60 is accomplished by the cam frame 70 acting directly against the idler roller shafts 64 and 65 such that the separations between the rollers occur either simultaneously or with a time delay in-between. If necessary, two or more idler rollers can be separated from corresponding drive rollers by the jam clearance mechanism.

It is not necessary to move the idler roller shafts 64 and 65 simultaneously when the rollers are separated; it is acceptable to move the idler roller shafts sequentially.

Also, instead of accomplishing the separations by the cam frame 70 acting against the idler roller shafts 64 and 65, it is acceptable for the cam frame 70 to act against the idler rollers 58 and 60.

Although in the previously explained preferred embodiment the nipped state between the idler rollers 58 and 60 and the drive rollers 57 and 59 is released preferably by separating the idler rollers 58 and 60 from the drive rollers 57 and 59, if necessary, it is acceptable to release the nipped state by separating the drive rollers 57 and 59 from the idler rollers 58 and 60.

It is also acceptable to move both the idler rollers 58 and 60 and the drive rollers 57 and 59 simultaneously in order to release the nipped state in-between.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image reading apparatus, comprising:
   a platen cover; and
   an automatic document feeder provided on the platen cover and arranged to feed a document from a paper supply port to a paper ejection port; wherein
   the automatic document feeder includes:
      a document feeding route including an upstream half route on a side nearer the paper supply port and a downstream half route on a side nearer the paper ejection port;
      a feeder cover arranged to cover the upstream half route and movable between a closed position and an open position;
      a roller mechanism including a plurality of drive rollers arranged along the downstream half route and a plurality of idler rollers arranged in positions opposite the drive rollers such that the downstream half route is disposed therebetween, the roller mechanism being arranged to nip a document between the drive rollers and the idler rollers and feed the document toward the paper ejection port; and
      a jam clearance mechanism that is arranged to face the downstream half route and arranged to separate the idler rollers and the drive rollers from each other in coordination with a movement of the feeder cover from the closed position to the open position; wherein
   when the feeder cover is moved from the closed position to the open position, at least one of the idler rollers is moved away from a corresponding drive roller;
   the jam clearance mechanism includes a cam frame arranged to undergo a sliding displacement in a direction along which a plurality of roller pairs are arranged, each roller pair including one of the idler rollers and one of the drive rollers, the sliding displacement occurring in coordination with opening and closing of the feeder cover; and
   at least one of the idler rollers is arranged to be movable by the cam frame.

2. The image reading apparatus according to claim 1, wherein
   the jam clearance mechanism further includes a first cam that is arranged on the cam frame and arranged to contact a shaft provided on an end portion of a main body of at least one of the idler rollers.

3. The image reading apparatus according to claim 1, wherein
   the jam clearance mechanism further includes a releasing body arranged to move at least one of the idler rollers in coordination with a sliding movement of the cam frame.

4. The image reading apparatus according to claim 3, wherein
   the releasing body is arranged to contact a shaft of at least one of the idler rollers; and
   the jam clearance mechanism includes a second cam that is arranged on the cam frame and arranged to move the releasing body.

5. The image reading apparatus according to claim 4, wherein
   the releasing body includes a shaft catching section arranged to catch a shaft of one of the idler rollers and a movement receiving piece arranged to be movable by the second cam.

6. The image reading apparatus according to claim 3, wherein
   the document feeding route has a sideways letter "U" shape, and the image reading apparatus further comprises a first reading unit that is arranged inside a document platform and arranged to read a first surface of a document and a second reading unit that is arranged in a space surrounded by the document feeding route and includes a contact glass to read a second surface of the document;
   the second reading unit is supported such that the second reading unit can pivot between an in-use position where the contact glass is positioned in the downstream half route and an escape position where the contact glass is located outside the upstream half route;
   the image reading apparatus further comprises a pressing frame arranged such that the pressing frame faces the contact glass of the second reading unit and presses a document against the contact glass; and
   the releasing body is provided on the pressing frame, and when the feeder cover is opened and the second reading unit is in the escape position, the entire upstream half route is open and a portion of the downstream half route located between the paper ejection port and a drive roller located closely adjacent to the pressing frame is open.

7. The image reading apparatus according to claim 1, wherein
   the cam frame includes a slide section including a length that extends in a direction along which the plurality of roller pairs are arranged.

8. The image reading apparatus according to claim 7, wherein
   the cam frame includes a movement receiving section provided as an integral portion of an end portion of the slide section;
   the cam frame is supported such that the cam frame is slideable between a first position in which a nipped state exists between the idler rollers and the drive rollers and a second position in which the idler rollers are separated from the drive rollers; and
   the feeder cover includes a pivot shaft, a first operating section provided near the pivot shaft and arranged to operate the movement receiving section toward an operating position, and a second operating section provided near the pivot shaft and arranged to operate the movement receiving section toward a waiting position.

9. The image reading apparatus according to claim 7, wherein
   the jam clearance mechanism includes a guide body arranged to guide an upper surface and a lower surface of the slide section such that the slide section can slide.

* * * * *